United States Patent [19]
Atkinson

[11] Patent Number: 5,824,161
[45] Date of Patent: Oct. 20, 1998

[54] DEVICE AND METHOD FOR HANDLING INJURIOUS MATERIALS

[76] Inventor: William Francis Atkinson, 16b Theodore Rd, Lewisham, London. SE13, England

[21] Appl. No.: 664,492

[22] Filed: Mar. 5, 1991

Related U.S. Application Data

[63] Continuation of Ser. No. 200,833, Jun. 1, 1988, abandoned.

[30] Foreign Application Priority Data

Jun. 4, 1987 [GB] United Kingdom ................. 13066/87

[51] Int. Cl.$^6$ ....................................................... B08B 7/04
[52] U.S. Cl. ................................. 134/6; 134/10; 134/21; 134/42; 15/227; 98/115.1; 98/115.2; 312/1; 312/3
[58] Field of Search ................................... 134/6, 10, 21, 134/42; 15/227; 98/115.1, 115.2; 55/DIG. 29, DIG. 46; 312/1, 3

[56] References Cited

U.S. PATENT DOCUMENTS

| | | |
|---|---|---|
| 1,567,270 | 5/1925 | Atkinson . |
| 2,473,033 | 6/1949 | Letac . |
| 4,335,712 | 6/1982 | Trexler ........................... 312/1 |
| 4,485,490 | 12/1984 | Akers ............................. 312/1 |
| 4,682,448 | 7/1987 | Healey . |
| 4,774,974 | 10/1988 | Teter ............................. 134/21 |
| 4,817,644 | 4/1989 | Holmes .......................... 134/6 |
| 4,911,191 | 3/1990 | Bain ............................ 134/200 |

FOREIGN PATENT DOCUMENTS

| | | |
|---|---|---|
| 178091 | 4/1986 | European Pat. Off. . |
| 644264 | 10/1928 | France . |
| 1186485 | of 1959 | France . |
| 3004066 | 8/1981 | Germany .................... 98/115.1 |
| 1109365 | 4/1968 | United Kingdom . |
| 1118657 | 7/1968 | United Kingdom . |
| 1296694 | 11/1972 | United Kingdom . |
| 1567270 | 5/1980 | United Kingdom . |
| 2044160 | 10/1980 | United Kingdom . |
| 2173143 | 10/1986 | United Kingdom . |
| 2176435 | 12/1986 | United Kingdom . |
| 2177963 | 2/1987 | United Kingdom . |
| 8605431 | 9/1986 | WIPO . |

*Primary Examiner*—Robert Kunemund
*Attorney, Agent, or Firm*—Merchant, Gould, Smith, Edell, Welter & Schmidt

[57] ABSTRACT

A method and device for removing harmful materials, e.g. asbestos, from areas such as ceilings that do not present an edge over which a container may be secured. The device comprises a flexible container with one end open, means for maintaining the end in a desired configuration and means for maintaining the end in abutting relation to a surface.

The walls of the container are provided with gauntlets through which work may be carried out on the surface and the container has a second closable opening with means nearby for retaining the open end of a bag into which the harmful material is to be put.

6 Claims, 2 Drawing Sheets

DEVICE AND METHOD FOR HANDLING INJURIOUS MATERIALS

This is a continuation of application Ser. No. 07/200,833, filed Jun. 1, 1988, which was abandoned upon the filing hereof.

BACKGROUND

This invention relates to a device for handling a substance dangerous to health or safety, and a method for handling the substance using such a device. The device and method are especially suitable for use in handling asbestos but may also be used in handling other harmful materials.

The long term danger to health caused by asbestos has been recognized for some years. Where existing machinery or a structure containing asbestos has to be dismantled, it is necessary to avoid exposure, of both those carrying out the work and people in the vicinity, to the material.

In British Patent No. 1567270, there are disclosed a device and a method using it for removal of, inter alia, asbestos lagging from pipework. In the embodiment described and illustrated, the device comprises a bag, the upper, open, end of which is specially constructed to enable it to be wrapped around a length of the pipework to seal within it the area to be stripped.

Devices of this type cannot, however, be used where the object from which the asbestos or other harmful material is to be removed, or on which other operations are to be carried out, presents no periphery over which an open end of the device may be positioned and sealed. This is the case with, for example, ceilings and walls from which it is necessary to remove panels or tiles which may contain asbestos or other harmful material.

SUMMARY OF INVENTION

The present invention is concerned to provide a device and method suitable for use in such cases.

The present invention accordingly provides a device comprising a flexible container having a first open end, means for maintaining the first open end in a desired configuration, and means for maintaining the first open end in abutting relation to a surface, the container having at least one aperture, the or each aperture advantageously being provided with a sleeve portion extending into the interior of the container, the container also having a second, closable, opening, the container preferably being provided with means near the second opening for retaining the open end of a bag. The invention also provides a kit of parts for the assembly of the device.

The container is advantageously provided with at least two spaced apart apertures, preferably having sleeve portions, and is preferably provided with at least six, conveniently seven, apertures with sleeve portions, which are so positioned and of such length that any part of the open end of the container, and preferably also any part of the space immediately outside the open end may be reached by at least one of the sleeves.

As used herein, the term "sleeve portion" or "sleeve" includes a sleeve of which the end which in use is within the device is open and a sleeve in which that end is closed, the sleeve then being in the form, for example, of a gauntlet which preferably has an elasticated wrist portion. The latter arrangement is preferred since there is no need for an operator to wear protective gloves or gauntlets. In the former arrangement, in which the end within the interior is open, the open end is advantageously elasticated, so that it fits snugly about the gloved or gauntleted arm of the operator, for example, at the wrist. The open-ended sleeve may also be provided, for example at an outer end, with a seal, e.g., a flap, to limit egress of harmful substances when the sleeve is empty.

It will accordingly be understood that when a closed end sleeve is present the aperture allows an operator to work on an object against which the open end of the device is positioned but does not allow material transfer between its interior and the environment. The sleeve length, if closed by a glove, is typically from 50 to 65 cm, and is preferably about 60 cm.

There is also advantageously provided at least one additional aperture in the container, generally of smaller cross-section than of the sleeve or sleeves, that is also advantageously provided with a sleeve extending into the interior and advantageously having an open, elasticated, end. The or each additional sleeve is generally smaller than the above-mentioned sleeve, for example the aperture may be of from 5 to 10 cm diameter, the sleeve being of length of about 12.5 cm and tubular terminating in an open end of nominal diameter of 5 to 10 cm; the end may, however, advantageously be elasticated so as to be virtually closed when the sleeve is empty. The additional aperture allows a water hose or, more especially, a vacuum line to enter the container. This aperture is advantageously located in a region of the container remote from the second opening.

In a presently preferred embodiment, the device is suitable for use in removing tiles or panels from ceilings or walls, the desired configuration of the open end of the container is rectangular, and the means for maintaining the open end in the desired configuration will be described with reference to such an opening configuration. It will be understood, however, that the open end may have any shape, either planar or non-planar, regular or irregular, that may be desired and suitable for the particular intended use of the device.

The means for maintaining the open end in the desired configuration advantageously comprises a plurality of rigid rails, or battens, which are advantageously positioned in channels provided along the wall at the open end of the container. The rails may be provided with cushioning means, for example, a strip of rubber, at least along the surface that will be closest to the surface of the area of the object being treated. The ends of the rails may be linked to each other, advantageously by rigid joint pieces, to assist in maintaining the desired configuration—in the case of the rectangular configuration, the joint pieces are 90° elbows. In an alternative, presently less preferred, embodiment the means for maintaining the desired configuration of the open end comprises a closed channel or channels at the open end that may be inflated to impart rigidity.

The means for maintaining the open end in abutting relationship to the surface advantageously comprises a plurality of elongate support members, preferably members resiliently biased to extend in length, a first end of each of which is positioned to hold a region of the container, preferably a region of the open end, in abutment to the surface, a second end of each being positioned against a second surface. Referring again to the embodiment in which the open end is rectangular, there are advantageously provided four support members preferably positioned one at each corner, and the first end of each support member is preferably connected to a joint piece provided with means for engaging the support member. Accordingly, a preferred joint piece comprises three arms each perpendicular to the other two.

Where the device is to be used for work on a ceiling, the support members are arranged with their second ends abutting the floor. Each support member advantageously comprises two or more legs, telescopically interengaged, with at least one pair of sections having a spring positioned between them and biasing them apart. Where the device is to be used for work on a wall, the support means may extend to an opposite wall, they may be appropriately shaped to extend to a nearby section of floor, or they may extend between the wall and both floor and ceiling.

The second, closable opening is advantageously in the form of a slot closable by a sliding clasp fastener, preferably one that may be operated from within the container and from outside it. As indicated above, the container is preferably provided with means for retaining a bag near the second opening. This means advantageously takes the form of a flexible surround to the opening extending outward from the outer surface of the container, the surround being rectangular in cross-section when the opening is a slot. The surround is preferably integral with or joined, as by welding, to the container. The surround is advantageously provided with a detachable rigid insert of cross-section similar to, but slightly smaller than, that of the surround, so that in use the surround may be made sufficiently rigid for the open end of a bag to be inserted around it, so that when the second opening is open there is ready communication between the interiors of the bag and the container.

In the presently preferred embodiment referred to above in which the open end is rectangular, the second opening is advantageously a closable slot in a wall defining an edge of the rectangular open end. Alternatively, the second opening is a circular orifice in the wall opposite the open end, preferably located at or near the centre of the wall, closable by a plug, and advantageously provided with a surround on the outer surface of the wall for retaining a bag. The surround advantageously has an outwardly extending flange, to support a bag secured by its neck, about the surround. This embodiment of the device is especially suitable for use in stripping a surface, for example a ceiling, in which a dangerous substance has been applied, e.g., by spraying, to form a continuous layer on the surface.

If desired, the device may be manufactured with the second, closable, opening closed, but readily rendered open and reclosable. In the embodiment described above in which the opening is a slot closable by a sliding clasp fastener, the fastener is installed by the manufacturer at the intended location of the slot, leaving the slot to be made by the user.

The present invention also provides a method for carrying out an operation on an object which comprises placing in abutting relation to a surface of the object an open end of a flexible container, the container having in addition to the open end at least one aperture, the or each aperture advantageously being provided with a sleeve portion extending into the interior of the container, and the container also having a second, closable opening, carrying out the operation on the object through the access thereto provided by the aperture or apertures while maintaining the open end in abutting relation to the surface of the object and, if desired or required, removing material taken from the object from the container through the second opening.

Advantageously the container forms part of a device constructed according to the invention. Advantageously, the container is maintained under sub-atmospheric pressure during the operation, preferably by its connexion through an aperture to a source of reduced pressure. In a presently preferred embodiment of the invention, the operation is the removal of tiles, especially tiles containing asbestos, from a ceiling, and the tiles are removed through the second opening to a bag attached thereto over a surround as described above with reference to a preferred device constructed in accordance with the invention.

The container is advantageously constructed of transparent material, for example, clear poly(vinyl chloride). Advantageously the wall thickness of the material is from 0.1 to 1.0 mm, preferably from 0.20 to 0.25 mm. The dimensions of the container will naturally depend on the intended use but, for removal of ceiling tiles, a container of the following approximate dimensions has been found suitable.

Top, (open) end; square, each side: 125 cm.

Bottom (closed) end; square, each side: 140 cm.

Side walls, height: 45 cm.

Second opening provided with sliding clasp fastener; length: 125 cm; location: 7.5 cm above base of one side.

Surround, width: 135 cm; height: 10 cm; projecting 15 cm, positioned symmetrically about second opening.

Channels, length: 125 cm; width when flattened: 7.5 cm.

Vacuum line opening, 7.5 cm diameter, sleeve 20 cm length, centrally located in side opposite to that of second opening.

Closed gauntlets, of length 60 cm, 2 on each of two remaining sides, each centered 10 cm above base, at distances one third and two thirds along length of side; 2 in the base, centrally located between each of the opposed pairs of gauntlets in the sides.

BRIEF DESCRIPTION OF DRAWINGS

Two forms of device constructed in accordance with the invention, and a method of operating using them, will now be described, by way of example only, with reference to the accompanying drawings, in which.

DETAIL DESCRIPTION OF INVENTION

Figure 1:
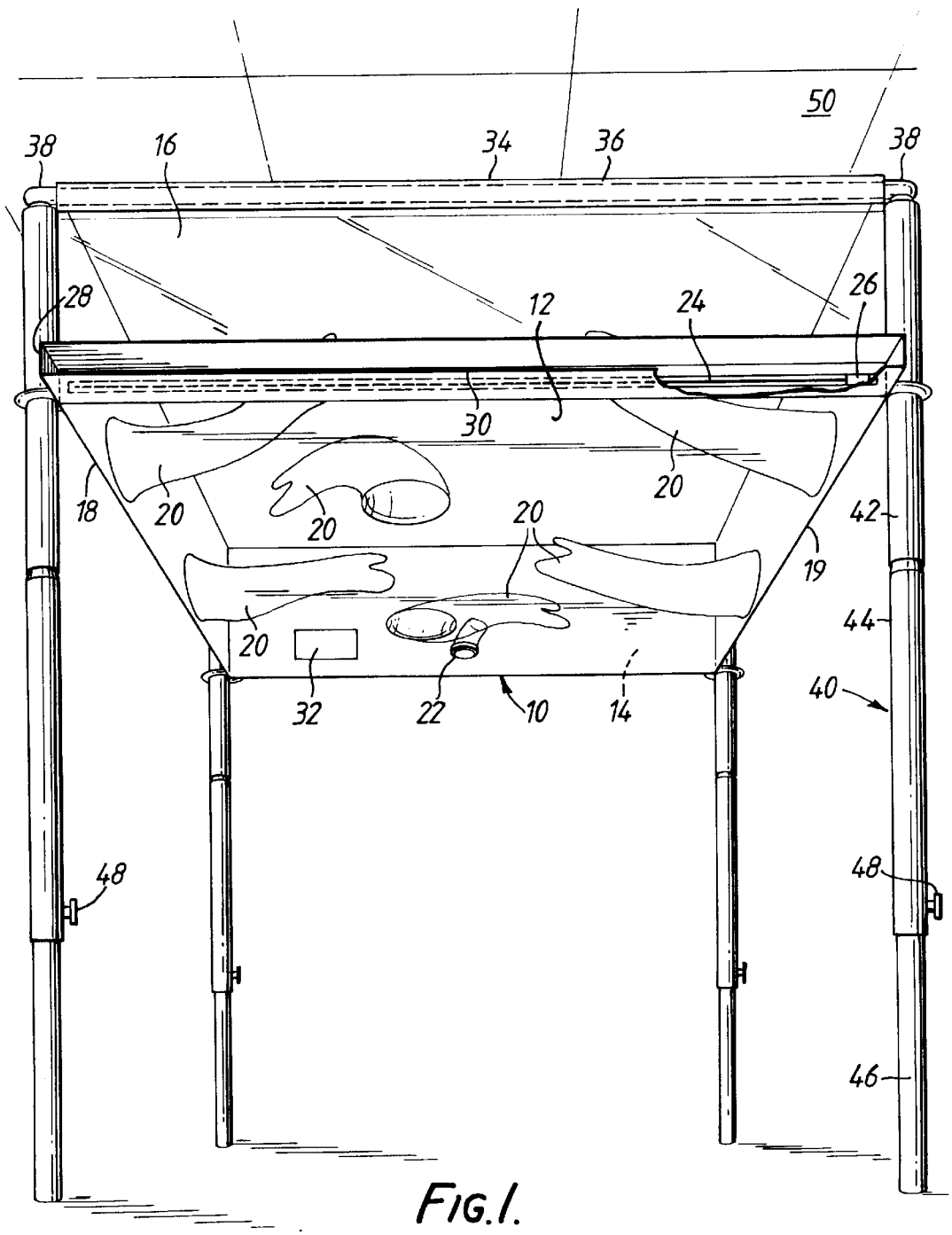
FIG. 1 is a perspective view of a device in position against a ceiling.

Referring now to FIG. 1, the device comprises a generally square-shaped transparent, flexible poly (vinyl chloride) container indicated generally by the reference numeral 10, which has a base 12, a rear wall 14, a front wall 16, and side walls 18, 19. Each side wall and the base are provided with two gauntlets 20, and the rear wall is provided with an open-ended sleeved aperture 22, to which may be connected a vacuum line (not shown). At the bottom of the front wall 16 is a slot 24, closed by a sliding clasp fastener 26, which may be operated both from within the container 10 and from outside it. On the exterior of the front wall 16 and projecting horizontally from it there is located around the slot 24 a rectangular surround 28, a force fit in which is a rigid insert 30. In use, the surround and insert 30 serve to locate the open end of a bag (not shown) for receiving material removed from the ceiling against which the container is positioned.

A pocket 32 in the shape of a muff is located on the rear wall 14, and a similar pocket (not shown) is provided on the side wall 19 between the central gauntlet and the gauntlet nearer the front wall. The muff-shaped pockets serve to carry tools and are positioned to be within reach of an operator using an appropriate gauntlet. The rear wall may, if desired or required, also be provided with a further gauntlet (not shown).

The upper end of each of walls 14, 16, 18, and 19, terminates in a channel 34 each of which contains a rail or batten 36 shown in phantom, each batten being rigid and having at least one rubberized surface. Each end of each batten is received in one arm of a three-armed joint piece 38, the third arm of which is oriented vertically downward to receive the upper end of a support member indicated generally by the reference numeral 40. The support members are constructed as described in British Specification No. 2170833A, and each comprises three members 42, 44, 46 telescopically engaged, the combined length of one pair of members 44, 46, being capable of being adjusted to and maintained at a desired value, for example by a thumbscrew 48 inserted through a threaded aperture in the outer member, the end of the screw engaging the inner member. The support means is provided with means for biasing it toward an extension in length, in the form of a compression spring (not shown) positioned over the end of the inner 44 of the pair of telescopically engaged members 42, 44.

The device is erected by inserting the battens 36 in the channels 34 and linking them with the joint pieces 38. The insert 30 is then placed in the surround 28, and any tools required placed in the pockets 32, and the fastener 26 closed. The sets of support members 42, 44, and 46 are put together, and the container lifted until the rubberized battens 36 abut the ceiling 50, the combined lengths of the support members 44 and 46 being adjusted so that good contact between the walls of the channels 34 and the ceiling 50 is maintained with the aid of the compression spring between members 42 and 44. The vacuum line is then put in operation to reduce the pressure in the container to below that of the atmosphere.

The operation on the ceiling is then carried out through the gauntlets and, when desired or required, a bag is placed over the surround 28, the fastener 26 is opened, and material removed to the bag.

Figure 2:
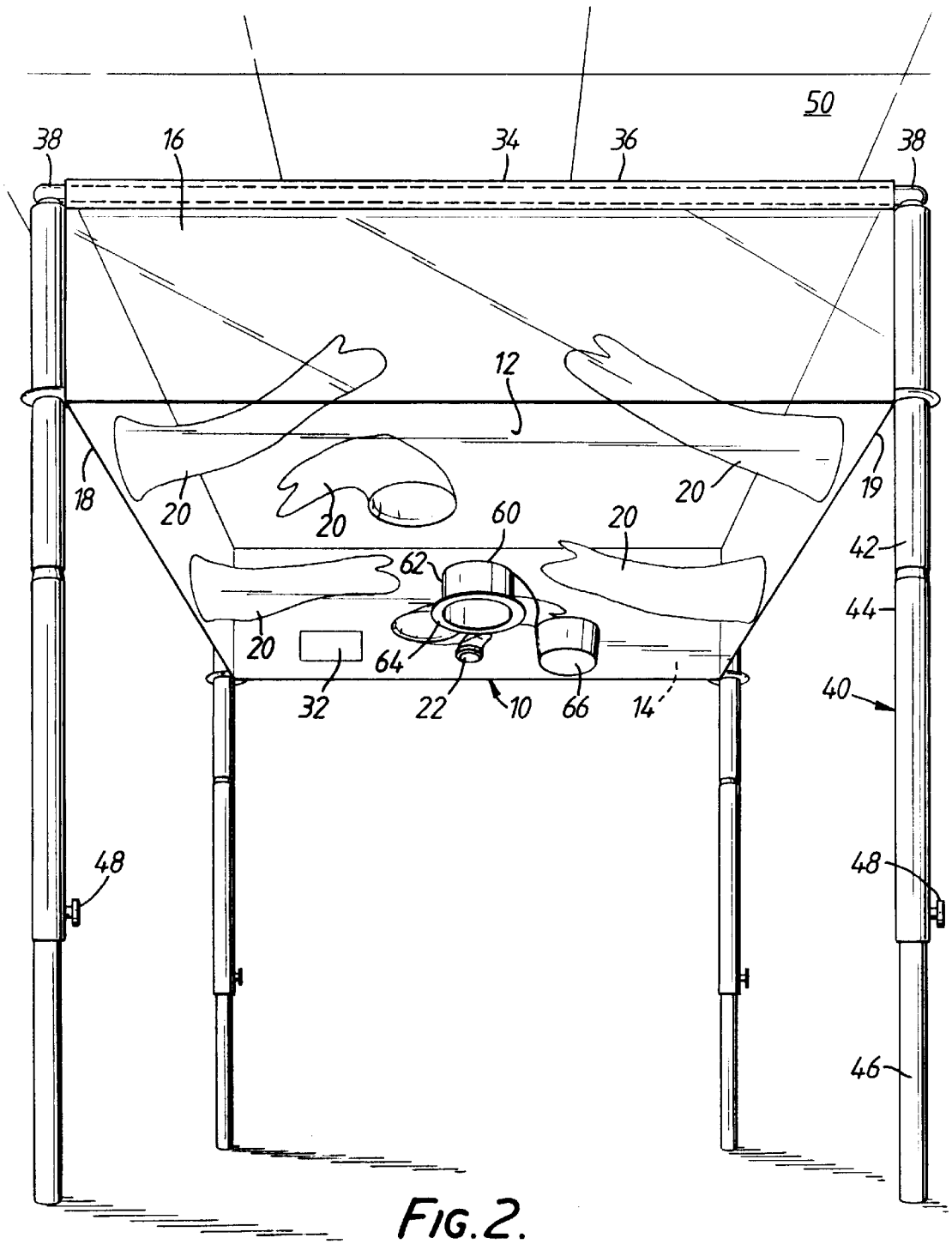
FIG. 2 is a similar view of a second device.

Referring now to FIG. 2, in the second embodiment there is provided, instead of the slot 24 and its associated fastener 26, surround 28 and insert 30, at the centre of the base 12 a circular orifice 60 having on the outer, or lower, surface of the base 12 a surround 62. The free end of the surround is formed into a flange 64, and a plug 66, attached for security to the upper end of the surround, is provided to fit into the surround and orifice. The other parts of the device are similar to those in the embodiment of FIG. 1 and are similarly numbered.

In use, the device is erected as in the embodiment of FIG. 1. After removing the plug 66 from the surround 62, the neck of a bag (not shown) is secured over the surround, the flange 64 serving to retain the bag in position. The operation on the ceiling is carried out as described with reference to FIG. 1, except that the material obtained after removing, e.g., asbestos sprayed onto a ceiling, is of smaller size and may be removed through the orifice 60. After the bag is removed and the plug is replaced, the device may be moved to another part of the ceiling.

It will be seen that the invention provides a safe and effective means for carrying out operations involving substances harmful to health. The flexibility of the container enables it to be packed for transporting from site to site, and the rigid inserts and supports ensure that the container remains in firm contact with the ceiling; in combination with the vacuum this contributes to a safer external working environment.

I claim:

1. An apparatus for confining asbestos fibers and the like floating in the air adjacent to a ceiling as a consequence of removing or repairing ceiling materials, comprising:

a flexible bag having an open top adapted to be positioned adjacent to a ceiling in surrounding relation to a desired area to be worked upon;

support means adapted for resting on a floor below said ceiling and formed for supporting said bag at desired elevations above said floor;

height regulating means on said support means formed for moving said bag toward and away from said ceiling; and glove means of flexible material sealed to said bag and extending into the interior thereof, said glove means being adapted for receiving and protecting a hand and a portion of an arm inserted into said glove means.

2. An apparatus as claimed in claim 1, which is provided with at least two glove means, which glove means are so positioned and which are of such length that no part of the open top is beyond the reach of an interior end of at least one of the glove means.

3. An apparatus as claimed in claim 1, which is suitable for use in removing tiles or panels from ceilings or walls, and the configuration of the open top of the bag is rectangular.

4. An apparatus as claimed in claim 1, further comprising means for maintaining the open top in a desired configuration comprising a plurality of rigid rails positioned in channels provided along the wall at the open top of the bag.

5. A containment for asbestos fibers and the like floating in the air adjacent to a ceiling as a consequence of removing or repairing materials on or near the ceiling, comprising:

a substantially fiber tight bag of flexible material having an open top adapted for placement in a position fitting in close proximity to a ceiling in surrounding relation to the ceiling area to be worked upon;

support means formed for removably holding said bag in the desired position relative to said ceiling;

sealing means on said open top of said bag adapted for cooperating with said ceiling to confine asbestos fibers; and glove means of flexible material sealed to said bag and adapted for providing protected access to the interior of said bag for the hand and arm of a user.

6. A containment for asbestos fibers and the like floating in the air adjacent to a ceiling as a consequence of removing or repairing materials on or near the ceiling, comprising a substantially fiber tight bag of flexible material having an open top adapted for placement in a position fitting in close proximity to a ceiling in surrounding relation to the ceiling area to be worked upon;

support means formed for removably holding said bag in the desired position relative to said ceiling;

sealing means on said open top of said bag adapted for cooperating with said ceiling to confine asbestos fibers;

glove means of flexible material sealed to said bag and adapted for providing protected access to the interior of said bag for the hands and arms of users;

the major portion of said bag being substantially transparent whereby a user having a hand inserted in said glove means can view the area of the ceiling being worked upon from outside said bag, said bag being formed of transparent flexible sheet plastic, said glove means comprising a plurality of pairs of flexible gloves sealed in laterally spaced relation to openings through said bag in position to accommodate simultaneously the hands and forearms of a plurality of users.

* * * * *